United States Patent Office 3,128,245
Patented Apr. 7, 1964

3,128,245
TREATING HYDROCARBON DISTILLATES
Robert P. Zimmerman, Downers Grove, Ill., assignor to Universal Oil Products Company, Des Plaines, Ill., a corporation of Illinois
No Drawing. Filed Nov. 24, 1961, Ser. No. 154,883
5 Claims. (Cl. 208—206)

This invention relates to the treatment of hydrocarbon distillates and, more particularly, to a novel combination process for oxidizing sour hydrocarbon distillates and producing a product of good color.

A recently discovered process for treating sour hydrocarbon distillates uses a phthalocyanine catalyst. In this process the sour hydrocarbon distillate is subjected to reaction with an oxidizing agent in the presence of the catalyst and an alkaline solution.

In some cases, treatment of hydrocarbon distillate as, for example, kerosene in the presence of an oxidizing agent, phthalocyanine catalyst and caustic solution has resulted in a kerosene of poor color. For example, a kerosene having an original Saybolt color of about 20 underwent a depreciation in color during such treatment to a Saybolt color of about —15.

For marketable purposes, it is important that the hydrocarbon distillate is of good color and any method of both sweetening and improving the color of the hydrocarbon distillate is desirable.

In one embodiment the present invention relates to a combination process for treating a sour hydrocarbon distillate to produce a distillate of reduced mercaptan content and of acceptable color which comprises reacting said distillate with an oxidizing agent in the presence of a phthalocyanine catalyst and thereafter treating said distillate with a hydrosulfite.

In a specific embodiment the present invention relates to a process for treating sour kerosene which comprises reacting said kerosene with air in the presence of cobalt phthalocyanine disulphonate catalyst and sodium hydroxide solution, and thereafter subjecting the distillate to treatment with zinc hydrosulfite.

From the hereinbefore embodiments, it will be seen that the combination process of the present invention entails the treatment of a hydrocarbon distillate with an oxidizing agent and a phthalocyanine catalyst and thereafter with a hydrosulfite.

The combination process of the present invention serves to produce a finally treated product of reduced mercaptan content and of acceptable color. As hereinbefore set forth, in many cases color depreciation occurs during the sweetening treatment and the subsequent treatment with a hydrosulfite serves to improve the color of the sweetened distillate.

The novel process of the present invention is used for the treatment of any hydrocarbon distillate. While the process may be used for the treatment of gasoline, naphtha, etc., it is particularly useful for the treatment of hydrocarbon distillates heavier than gasoline, including kerosene, solvent, stove oil, range oil, burner oil, gas oil, fuel oil, etc. In general, the kerosene will have an initial boiling point of from about 300° to about 450° F. and an end boiling point of from about 475° to about 550° F. Solvents and stove oil, for example, usually have initial boiling points within the range of from about 350° to about 500° F. and end boiling points of from about 525° to about 600° F.

Any suitable phthalocyanine catalyst may be used in accordance with the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, molybdenum phthalocyanine, chromium phthalocyanine, tungsten phthalocyanine, etc. The metal phthalocyanine, in general, is not readily soluble in aqueous solvents and, therefore, when used in an aqueous alkaline solution or for ease of compositing with a solid carrier, a derivative of the phthalocyanine is preferred. A particularly preferred derivative is the sulfonated derivative. Thus, an especially preferred phthalocyanine catalyst is cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any source or prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

As hereinbefore set forth, treatment of the hydrocarbon distillate in the presence of the phthalocyanine catalyst preferably also is effected in the presence of an alkaline reagent. Any suitable alkaline reagent may be employed. A preferred reagent comprises an aqueous solution of an alkali metal hydroxide such as sodium hydroxide (caustic), potassium hydroxide, etc. Other alkaline solutions include aqueous solutions of lithium hydroxide, rubidium hydroxide, cesium hydroxide, etc. although, in general, these hydroxides are more expensive and, therefore, generally are not preferred for commercial use. Preferred alkaline solutions are aqueous solutions of from about 1% to about 50% and more preferably 5% to 25% by weight concentration of sodium hydroxide or potassium hydroxide. While aqueous solutions are preferred, it is understood that other suitable solvents may be used including, for example, alcohols, ketones, etc., or mixtures thereof, either as such or diluted with water.

Treating of the hydrocarbon distillate with the phthalocyanine catalyst is effected at any suitable temperature, which may range from ambient to 210° F. when operating at atmospheric pressure or up to about 400° F. or more when operating at superatmospheric pressure. In general it is preferred to utilize a slightly elevated temperature which may range from about 100° F. to about 175° F. Atmospheric pressure or superatmospheric pressure, which may range up to 1000 pounds or more, may be used.

Treatment of the hydrocarbon distillate with the phthalocyanine catalyst is effected in any suitable manner and may be either batch or continuous type of operation. Regardless of which method is used, the phthalocyanine catalyst is employed either as a solution or as a fixed bed. When the catalyst is employed in solution, the amount of catalyst may range from 5 to 1000 parts per million or more and preferably from about 20 to about 500 parts per million by weight of the alkaline reagent solution. In one embodiment the catalyst previously is prepared as a solution in a suitable solvent including ammoniated water, aqueous sodium hydroxide, etc., and then is introduced in this manner to the oxidation zone. In another embodiment the catalyst is added as such to the oxidation zone, to become dissolved in the alkaline reagent solution therein.

When the catalyst is employed as a fixed bed in the oxidation zone, the catalyst is prepared as a composite with a solid support. Any suitable support may be employed and preferably comprises activated charcoal, coke or other suitable forms of carbon. In some cases the support may comprise silica, alumina, magnesia, etc. or mixtures thereof. The solid catalyst is prepared in any suitable manner. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these treatments prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.1% to 10% by weight or more of the composite.

In a batch type operation, the sour hydrocarbon distillate, alkaline reagent solution and catalyst are disposed in a reaction zone, and air is bubbled therethrough until the desired oxidation is completed. In a continuous type operation, the sour hydrocarbon distillate, alkaline reagent solution and catalyst, when the latter is employed in dissolved form, are supplied to the oxidation zone, preferably at a lower portion thereof. It is understood that the catalyst and alkaline reagent solution may be introduced to the reaction zone either separately or in admixture and either commingled with or separate from the sour hydrocarbon distillate. In a fixed bed continuous process, the catalyst is disposed as a fixed bed in a reaction zone, and the sour hydrocarbon distillate, air and alkaline solution, when desired, are passed into the reaction zone, in upward or downward flow, and either together or separately.

Regardless of the particular operation employed, the products are separated to recover treated hydrocarbon distillate of reduced mercaptan content and to separate alkaline reagent solution for reuse in the process. When the soluble catalyst is employed, the catalyst is recovered in admixture with the alkaline reagent solution and is recycled therewith for further use in the process. When desired, additional quantities of phthalocyanine catalyst may be added continuously or intermittently during the treatment of the sour hydrocarbon distillate.

As hereinbefore set forth, the hydrocarbon distillate following the treatment with phthalocyanine catalyst, in many cases, will be of poor color. As will be shown in an example appended to the present specifications, such treatment of kerosene having an initial Saybolt color of 20 resulted in a treated kerosene having a Saybolt color of −15. In accordance with the present invention, the kerosene now is treated with a hydrosulfite.

Any suitable hydrosulfite may be used in accordance with the present invention. The hydrosulfite also is named hyposulfite and dithionite. Zinc hydrosulfite and sodium hydrosulfite are particularly preferred. Other hydrosulfites include potassium hydrosulfite, lithium hydrosulfite, calcium hydrosulfite, strontium hydrosulfite, barium hydrosulfite, magnesium hydrosulfite, copper hydrosulfite, titanium hydrosulfite, vanadium hydrosulfite, chromium hydrosulfite, manganese hydrosulfite, iron hydrosulfite, cobalt hydrosulfite, nickel hydrosulfite, platinum hydrosulfite, palladium hydrosulfite, rhodium hydrosulfite, molybdenum hydrosulfite, silver hydrosulfite, gold hydrosulfite, etc. The above are illustrative of the metal hydrosulfites. An example of a non-metal hydrosulfite is ammonium hydrosulfite. It is understood that the different hydrosulfites are not necessarily equivalent, but all of them will be active in improving the color of the hydrocarbon distillate after treatment with the phthalocyanine catalyst.

The hydrosulfite may be obtained from any suitable source or prepared synthetically. In one method zinc hydrosulfite is prepared by the reduction of $HSO_3^-$ with zinc. The other hydrosulfites may be prepared by utilizing the other metals or ammonia, as desired.

Treatment of the hydrocarbon distillate with the hydrosulfite is effected in any suitable manner. In one method an aqueous solution of the hydrosulfite is formed and the aqueous solution is used to wash the hydrocarbon distillate, either in a continuous type countercurrent method or in a batch type in which the hydrocarbon distillate and aqueous solution of hydrosulfite are mixed in a suitable vessel, allowed to separate into a hydrocarbon phase and an aqueous phase in either the same or different zone, and each phase is separately withdrawn. In place of water as a solvent, alcohol, ketone or other suitable solvent may be employed. In another method, the hydrosulfite is packed as a fixed bed in a suitable zone, and the hydrocarbon distillate is passed therethrough in either an upward or downward flow.

The treatment of the hydrocarbon distillate with the hydrosulfite preferably is effected at a mild temperature which may range from atmospheric to about 150° F. Generally, higher temperatures should be avoided because of the possible decomposition of the hydrosulfite at the higher temperature. The pressure will vary with the particular type of operation and may range from atmospheric to 1000 pounds or more, generally within the range of from atmospheric to 100 pounds per square inch.

While the combination process of the present invention is particularly applicable to the treatment of sour hydrocarbon distillates, it is understood that it may be used for the treatment of mercaptan-containing fractions from other sources as, for example, alcohols, ketones, aldehydes, etc. In still another application, the novel features of the present invention are employed for the oxidation of mercaptans synthetically prepared or recovered as a special fraction containing the mercaptan as a substantial or major portion thereof. In such cases it may be desired to oxidize the mercaptan to the corresponding disulfide.

The following examples are introduced to illustrate further the novelty and utility of the present invention but not with the intention of unduly limiting the same.

*Example I*

A commercial kerosene having a mercaptan content of 0.0292% and a Saybolt color of 20 was treated in a stirred reactor at 185° F. with an equal volume of aqueous 20° Baumé caustic solution containing 250 parts per million of cobalt phthalocyanine disulphonate catalyst for 40 minutes. The mercaptan content of the treated kerosene was reduced to 0.00044% and was negative to the doctor test. However, the Soybolt color of the treated kerosene had depreciated to −15.

The above kerosene then was washed with a 5% aqueous solution of zinc hydrosulfite at room temperature. The Saybolt color of the washed kerosene was increased to +14.

From this example it is seen that the combination process of the present invention produced a kerosene of reduced mercaptan content and of acceptable color.

*Example II*

A West Texas kerosene having a boiling range of 357° to 489° F. and a mercaptan sulfur content of 0.1% by weight is treated with vanadium phthalocyanine sulphonate at 120° F. and 50 pounds per square inch in a batch type operation. The kerosene in admixture with potassium hydroxide and air is passed upwardly through a zone containing the phthalocyanine catalyst as a fixed bed in a reaction zone, and the effluent products are passed into a settling zone where excess air is vented. The hydrocarbon separates from potassium hydroxide solution and the latter is recycled within the process. The hydrocarbon phase then is passed downwardly through a fixed bed of sodium hydrosulfite at ambient temperature. The finally treated kerosene is reduced in mercaptans and is of acceptable color.

*Example III*

Aromatic solvent containing mercaptans is treated with air in the presence of cobalt phthalocyanine sulphonate catalyst at 130° F. and 100 pounds per square inch in a batch type operation. The partly treated solvent then is treated with zinc hydrosulfite at room temperature. The finally treated solvent is negative to the doctor test and is of acceptable color.

I claim as my invention:

1. A combination process for treating a sour hydrocarbon distillate to produce a distillate of reduced mercaptan content and of acceptable color, which comprises reacting said distillate with an oxidizing agent in the presence of a phthalocyanine catalyst, separating from the catalyst a sweetened distillate of depreciated color, and thereafter treating the separated distillate with sufficient hydrosulfite to improve the color of the distillate.

2. A combination process for treating sour kerosene to produce a kerosene of reduced mercaptan content and of an acceptable color, which comprises reacting said kerosene with air in the presence of cobalt phthalocyanine sulphonate catalyst and alkaline solution, separating from the catalyst a sweetened kerosene of depreciated color, and thereafter treating the separated kerosene with sufficient zinc hydrosulfite to improve the color of the kerosene.

3. A combination process for treating sour kerosene to produce a kerosene of reduced mercaptan content and of acceptable color which comprises reacting said kerosene with air in the presence of vanadium phthalocyanine sulphonate catalyst and alkaline solution, separating from the catalyst a sweetened kerosene of depreciated color, and thereafter treating the separated kerosene with sufficient zinc hydrosulfite to improve the color of the kerosene.

4. A combination process for treating sour kerosene to produce a kerosene of reduced mercaptan content and of an acceptable color which comprises reacting said kerosene with air in the presence of cobalt phthalocyanine sulphonate catalyst and alkaline solution, separating from the catalyst a sweetened kerosene of depreciated color, and thereafter treating the separated kerosene with sufficient sodium hydrosulfite to improve the color of the kerosene.

5. A combination process for treating sour kerosene to produce a kerosene of reduced mercaptan content and of acceptable color which comprises reacting said kerosene with air in the presence of vanadium phthalocyanine sulphonate catalyst and alkaline solution, separating from the catalyst a sweetened kerosene of depreciated color, and thereafter treating the separated kerosene with sufficient sodium hydrosulfite to improve the color of the kerosene.

References Cited in the file of this patent

UNITED STATES PATENTS 2,966,452     Gleim _____ Dec. 27, 1960